United States Patent Office 3,482,293
Patented Dec. 9, 1969

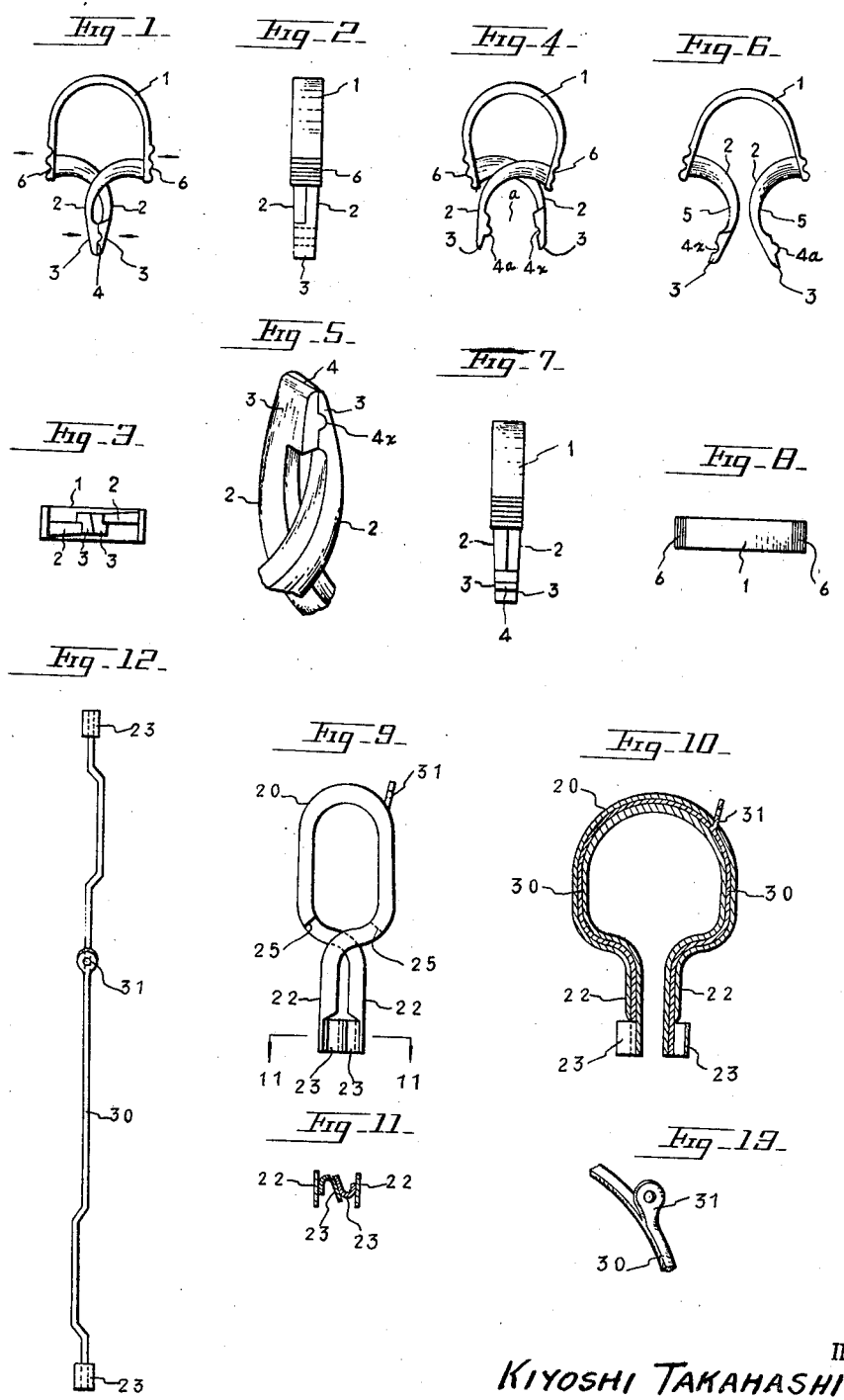

3,482,293
CLIP DEVICE
Kiyoshi Takahashi and Akira Takahashi, both of 140 1-chome, Sakai, Edogawa-ku, Tokyo, Japan
Filed Jan. 9, 1968, Ser. No. 696,590
Int. Cl. A44b 21/00
U.S. Cl. 24—255
2 Claims

ABSTRACT OF THE DISCLOSURE

A clasping device in which the elastic springing part and the clasping or holding members are made of plastic in pair form and the clasping faces of the twisted clasping members are engaged with each other in such manner that the clasping members are crossed to each other.

---

The present invention relates to a clasping device and more particularly to such clasping or holding device which comprises, in integral formation, a pair of holding members and a resilient springing part made of elastic resin and curved arcuately so that the stress is imparted uniformly all over said part, wherein said holding or clasping members are disposed side by side at both ends of said resilient springing part and crossed to each other so as to produce at the resilient springing part a stress which acts to always press-contact the clasping faces of said clasping members, with said clasping faces being also so formed as to inhibit dislocation from the contacted position of the clasping faces of said clasping members.

Most of the varied conventional types of clasping or holding devices comprise a clasping body and a spring, that is to say, such conventional devices are usually composed of a combination of at least two parts. And such spring is, in many cases, a metal spring which is apt to rust and, when such device is used for the washing, it is likely to stain or impair the washing.

Also, since such device is composed of two or more parts, a transverse vibration is produced, causing the spring to disclocate or to break. It has the additional defect that the material which was supported to have been clasped may come to slip out of the clasping device.

In general, since a clasping or holding device for the laundry is a daily necessity, it is highly desirable to simplify the manufacturing process on a mass production basis to supply the article to users at a low price. Such requirement may be fulfilled by integrally forming, with plastic material, the holding parts and the spring means, instead of composing the device from a combination of a holding body and a separately prepared metal spring as conventionally practiced.

However, any idea of utilizing plastics to replace the conventional metal spring for the springing means in a clothespin has not been proposed or even considered as a practical clothespin means in the art. Also, although inherent resiliency of plastics is utilized as a spring means in some articles, such plastic-made spring is used only in such parts which are structurally of little importance. Namely, plastics has so far been considered as an "imitation" or "substitution" of inferior quality, and the metal spring has been preoccupiedly believed as the most suitable spring means in all cases.

At present, polyacetal resin, polycarbonate resin, polyfleon resin and ABS nylon have been developed as a spring means which functions effectively as a high grade spring. It is also anticipated that other such or more excellent plastic materials of spring disposition will come out and be made available at a low price. These materials constantly impart deforming pressure to the spring part within the temperature range of −40° C. to +50° C. and, even when used in a clothespin which may be immersed in alkali solution, they can fully stand the harsh conditions observed in practical uses. Thus, if these materials are used to integrally mold the clasping parts and the spring part of a clasping device, the resulting product which may be obtained in finished shape immediately from the dies will prove to be the one which is free of said defects inherent to the conventional articles and is corrosion proof, highly resistive to chemicals, solid and stout, and saves trouble and labor, thus providing an ideal low cost clasping device.

Being composed as described above, the device of the present invention has no fulcrum unlike the conventional clasping devices. Complete elimination of fulcrum in the clasping deivce permits 100 percent transmission of the springing force to the grasping part since there is no loss of force to be otherwise imparted to the fulcrum. However, as a natural result of the absence of fulcrum, the clasping part tends to bias in one direction. To compensate for such undesirable disposition, the present invention proposes an arrangement in which the sections of the clasping faces are formed not at right angles but at a slant to each other so that they may bite firmly into each other.

In case the clasping device is integrally molded from plastics as in the present invention, the elastic springing part becomes the most important part in all function of the clasping device and such part undergoes the severest breaking force since the deforming pressure is imparted to this part continuously for a long time.

To disperse the concentrated stress on this part and to afford durability to said part, it is most desirable to form in circle this elastic springing part and to compose this part from a fibrous molecular structure. If the molten plastic is poured from one slit in a circular die and the resin flow makes one rotation and stops at the other slit, there is produced a splendid fibrous structure between both slits.

The present invention is based on this principle. Namely, the present device is formed by pouring plastics from the clasping part at one end of the clothespeg, with this plastic flow being stopped at the clasping part at the other end, so that the resulting product can stand an extremely long time use without producing elastic fatigue even under harsh conditions. It needs to enlarge the sectional thickness at the central portion of said spring part where stress is concentrated. Such arrangement plays a vital roll in preventing generation of fatigue. In the present invention, thickness at the central portion is arranged larger by about 20 to 25% than at other portions.

According to the present invention, first the body of a clasping device is molded in a die, and then the clasping members at both ends thereof are crossed to each other and then twisted so that the clasping faces are press-contacted in a biting manner to each other. The springing forces of both clasping members therefore work on the opposite directions so that the combined clasping force is doubled.

The foregoing and other objects and features of the present invention will become more clear from reading the following descriptions and the appended claims with reference to the accompanying drawings, in which:

FIGURE 1 is a front view illustrating a mode of practice of the clasping device according to the present invention;
FIGURE 2 is a left side view of FIG. 1;
FIGURE 3 is a bottom plan view of FIG. 1;
FIGURE 4 is a front view of the present device illustrating the clasping members in open position;
FIGURE 5 is a partial enlarged view of the clasping members;

FIGURE 6 is a front view illustrating an open condition before the clasping members are combined;

FIGURE 7 is a left side view of FIG. 6;

FIGURE 8 is a plan view of FIG. 6;

FIGURE 9 is a front view of another embodiment of the present invention in which an electroconductor is embedded in the inside of the clasping device for utilization as a pegging device for measuring electric current;

FIGURE 10 is a longitudinal sectional view illustrating a condition before the clasping members of the clasping device of FIG. 9 are combined;

FIGURE 11 is a sectional view as taken on the line 11—11 of FIG. 9;

FIGURE 12 is an extended view of the electroconductor embedded in the clasping device; and FIGURE 13 is a slant view of the wire connecting terminal of the conductor.

Some preferred embodiments of the present invention will be hereinafter explained while referring to the accompanying drawings in general.

Most conveniently used as the material for composing the clasping device of the present invention is elastic resin such as polycarbonate, nylon, polypro and ABC resin. By using such material, a structure such as shown in FIGS. 6–7 is first molded. The arcuately curved elastic springing part 1 and a pair of opposed and spaced clasping members 2, extended integrally from both ends of said elastic part and arranged so as to crisscross with each other, are molded in one step by jet molding. At the ends of said clasping members 2 are provided the clasping parts 3, which are arranged in such manner that their respective clasping faces 4 are faced outwardly, that is in opposite directions to each other. Each clasping member 2 has its middle portion dented along its external edge as shown in FIG. 7 to form a recess 5. On the external side at the bottom ends of the elastic spring part 1 are formed jagged or ribbed faces 6, where the fingers are placed to compress them. On one of the clasping faces 4, there is a cross jag or rib 4a and on the other face 4 there is a cross groove 4x so that when the clasping faces are combined in the manner shown in FIG. 5, the cross rib 4a on one face fits in the cross groove 4x on the other face, thus guaranteeing a secure hold therebetween.

In the present invention, the clasping members 2 having the above-described configuration are first pressed in the direction of the crisscross in FIGS. 7 and 8 to take a position opposite to that of FIG. 7 and then twisted in such manner that the recesses 5 may be fittedly engaged with each other. Then, the elastic springing part 1 is compressed to bring the clasping members in a crossed combination in such manner that the clasping parts 3 are juxtaposed in the manner shown in FIG. 1. By this means, the elastic springing part 1 is placed in such condition that its both ends always tend to spring out outwardly, thus permitting the clasping faces 4, of the clasping members 2, to be kept in a securely press-contacted state.

The present invention is composed in the above-described combination so that, since the clasping members 2 are engaged at their recesses 5, a stress which acts to hold the crossed juxtaposed faces in an always mutually bitten condition is produced in the elastic springing part. The engaging faces of the clasping members 2 are thus kept free from any inadvertent dislocation, permitting the clasping faces 4 of the clasping parts 3 to be always press-contacted. When it is desired to hold an object between the clasping parts, first the finger-placed parts 6, at both ends of the elastic springing part 1, are pressed inwardly as shown in FIG. 4, whereby said elastic part is compressed against its springing force, thus deepening the crossed positions of the clasping members 2, resulting in opening the clasping faces 4 at the bottom ends thereof and forming a space a (FIG. 4) therebetween, thus increasing the spring force of the elastic part 1. Here, a desired object is forced into said space a and the compressing pressure on the elastic part is released, whereby the restoring springing force thus produced causes the clasping faces 4 to spring back to each other with said object held therebetween. Thus the object is securely held between the clasping faces. In addition, since the clasping faces 4 are slanted as shown in FIG. 5, there is no slip on the clasping faces, thus attaining always firm and secure holding operation.

As viewed above, since the elastic springing part and the clasping members are composed integrally, the present clasping device is free of transverse vibration, dislocation of spring or slip-out of the object held therein. Further, since the whole structure is made of synthetic resin, the device is rust-proof so that, when it is used as a clothespeg, there is no fear of staining or impairing the laundry. Thus the practicality of the present clasping device is extremely high. Still further, the present device is molded in a die and, without necessity of any after-working, it suffices to twist and engage the clasping members to attain the desired combination. Thus the manufacturing cost of the present device is sizably reduced in comparison with other products. Additional advantages of the present device are the corrosion-proof property of the composing material and its extremely high resistance against chemicals, which even broadens the scope of utilization, and its excellent structural strength.

Now, the discussion is directed to another embodiment of the present invention, in which an electroconductor is embedded in the inside of the clasping device to use it as a clasping means for measuring the amperage of electric current which will be explained hereinbelow with special reference to FIGS. 9, 10 and 11. 30 denotes an elongated piece of electroconductor which may be linear or strip-shaped. At both ends thereof are provided the protuberant clasping elastic members 23, and at a part in the middle of said conductor strip is provided a wire connecting terminal 31 in projected form.

Said clasping elastic members 23, are composed of plates symmetrically curved in the manner as shown in FIG. 11 at both ends of the conductor 30, and their contacted faces are bevelled so as to inhibit the clasping faces from being dislocated.

Said conductor 30 has its surface coated with resilient plastic, only leaving exposed the opposed faces of the clasping elastic members 23, and the terminal 31. Concurrently with molding, an arcuately curved elastic springing part 20 is provided in the middle, while providing at both ends thereof a pair of opposed clasping leg elements 22. It will be noted that the terminal 31 in the center is exposed out of the external surface of the elastic springing part 20.

25 denotes a pair of recesses formed symmetrically at the proximal ends of the clasping leg elements 22. When said leg elements are crossed, these recesses are fittedly engaged with each other to hold the leg elements in the crossed condition.

In this embodiment, the clasping leg elements 22 are first brought to a crossed position opposite to the position shown in FIG. 1 and then twisted so that the recesses are fittedly engaged with each other and thereafter the elastic springing part 20 is compressed and crossed to attain a combined arrangement as shown in FIG. 3. By this arrangement, the elastic springing part 20 is given at its both ends a springing force which always works in the outward opening direction, thus permitting the opposed faces of the clasping elastic members 23 at the ends of the leg elements 22 to remain in a securely press-contacted condition.

As illustrated above, since every gripped part of the clasping device is coated with plastics, such coated part is perfectly insulated, making it easy to handle the device and possible to attain a secure clasping or holding function. Further, this coating, in cooperation with the embedded conductor, helps to increase elasticity of the plastics and the structural strength of the product, thus greatly enhancing practicality of the device as a clasping means for measuring the amperage of electric current.

What is claimed is:

1. A clasping device in which an arcuately curved elastic springing part and a pair of clasping members with faces are integrally molded from elastic resin so that the stress is uniformly distributed all over the structure, said clasping members being juxtaposed at both ends of said elastic springing part and combined in a mutually crossed state so as to produce on said elastic part a stress which works to keep the clasping faces always press-contacted, over the entire area thereof, said clasping faces being formed in such configuration as to inhibit dislocation of said clasping faces from their press-contacted positions, the clasping faces of the clasping members are being slanted relative to each other, and a rib and groove connection between the faces of the members.

2. A clasping device in which an arcuately curved elastic springing part and a pair of clasping members with faces are integrally molded from elastic resin so that the stress is uniformly distributed all over the structure, said clasping members being juxtaposed at both ends of said elastic springing part and combined in a mutually crossed state so as to produce on said elastic part a stress which works to keep the clasping faces always press-contacted, over the entire area thereof, said clasping faces being formed in such configuration as to inhibit dislocation of said clasping faces from their press-contacted positions, a strip of conductor having a wire connecting terminal and a pair of clasping elastic members being embedded in the inside of the clasping device, said terminal being exposed above the surface of the elastic springing part and said clasping elastic members being press-contacted with each other.

References Cited

UNITED STATES PATENTS

| 1,452,194 | 4/1923 | Dusinberre | 339—261 |
| 1,464,151 | 8/1923 | Dusinberre. | |
| 1,468,884 | 9/1923 | Schneider | 24—137.5 |
| 2,522,810 | 9/1950 | Bailey. | |
| 2,583,020 | 1/1952 | Smith | 24—137 |

FOREIGN PATENTS 304,694   4/1955   Switzerland.

DONALD A. GRIFFIN, Primary Examiner

U.S. Cl. X.R.

339—261